United States Patent
Yared

(10) Patent No.: US 9,749,981 B2
(45) Date of Patent: Aug. 29, 2017

(54) IMS SYSTEM AND METHOD FOR TRANSMITTING A REREGISTER REQUEST TO AN S-CSCF

(71) Applicant: Marlene Yared, Dollard des Ormeaux (CA)

(72) Inventor: Marlene Yared, Dollard des Ormeaux (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 87 days.

(21) Appl. No.: 14/425,756

(22) PCT Filed: Feb. 20, 2015

(86) PCT No.: PCT/IB2015/051318
§ 371 (c)(1),
(2) Date: Mar. 4, 2015

(87) PCT Pub. No.: WO2016/132183
PCT Pub. Date: Aug. 25, 2016

(65) Prior Publication Data
US 2016/0345284 A1 Nov. 24, 2016

(51) Int. Cl.
*H04W 60/04* (2009.01)
*H04L 12/741* (2013.01)
(Continued)

(52) U.S. Cl.
CPC ......... *H04W 60/04* (2013.01); *H04L 41/0654* (2013.01); *H04L 45/22* (2013.01);
(Continued)

(58) Field of Classification Search
CPC .... H04W 60/04; H04W 84/042; H04L 45/22; H04L 41/0654; H04L 45/74; H04L 65/1073; H04L 65/1016
See application file for complete search history.

(56) References Cited

U.S. PATENT DOCUMENTS

| | | | | |
|---|---|---|---|---|
| 2009/0022298 A1* | 1/2009 | Qiu | ........................ | H04L 47/125 379/211.01 |
| 2011/0083014 A1* | 4/2011 | Lim | ................... | H04L 29/12764 713/168 |
| 2014/0018039 A1* | 1/2014 | Lau | ........................ | H04W 8/20 455/411 |

FOREIGN PATENT DOCUMENTS

| | | | | |
|---|---|---|---|---|
| IN | WO 2009083754 A1 * | 7/2009 | ........ | H04M 3/42195 |
| WO | 2015007310 A1 | 1/2015 | | |

OTHER PUBLICATIONS

3GPP TR 23.820 V8.0.0 Technical Report 3rd Generation Partnership Project;Technical Specification Group Core Network and Terminals; Study on IMS Restoration Procedures (Release 8) [online], Jun. 2008 [retrieved on Mar. 17, 2017]. Retrieved from the Internet: <URL: http://www.qtc.jp/3GPP/Specs/23820-800.pdf>, pp. 1-41.*

(Continued)

*Primary Examiner* — Omar Ghowrwal
(74) *Attorney, Agent, or Firm* — Julie Dufort; Ericsson Canada Inc.

(57) ABSTRACT

The invention relates to methods, IMS system, and nodes such as P-CSCF, I-CSCF and S-CSCF for bypassing a network node, such as the HSS, during a reregistration procedure. Communication links are monitored and if a probability of success of a new request to the network node is within a range, then the network node can be bypassed.

20 Claims, 10 Drawing Sheets

(51) Int. Cl.
H04L 29/06 (2006.01)
H04L 12/24 (2006.01)
H04L 12/707 (2013.01)
H04W 84/04 (2009.01)

(52) U.S. Cl.
CPC .......... *H04L 45/74* (2013.01); *H04L 65/1016* (2013.01); *H04L 65/1073* (2013.01); *H04W 84/042* (2013.01)

(56) References Cited

OTHER PUBLICATIONS

Written Opinion of the International Searching Authority, PCT/IB2015/051318, [database online], dated Aug. 25, 2016 [dated Mar. 17, 2017] Retrieved from Patentscope database of the World Intellectual Property Office using Internet <URL: https://patentscope.wipo.int/search/en/detail.jsf?docId=WO2016132183&recNum=1&tab=>, pp. 1-9.*

International Search Report from corresponding application PCT/IB2015/051318.

3GPP, "3rd Generation Partnership Project; Technical Specification Group Core Network and Terminals; IP multimedia call control protocol based on Session Initiation Protocol (SIP) and Session Description Protocol (SDP); Stage 3, (Release 11)" 3GPP, TS 24.229, V11.12.0 (Jun. 2014), pp. 1-785.

ETSI TS 123 228 V12.7.0 (Jan. 2015); Digital cellular telecommunications system (Phase 2+);Universal Mobile Telecommunications System (UMTS);LTE;IP Multimedia Subsystem (IMS);Stage 2; (3GPP TS 23.228 version 12.7.0 Release 12), pp. 1-312.

D. Willis et al., "Session Initiation Protocol (SIP) Extension Header Field for Service Route Discovery During Registration," Network Working Group: The Internet Society, RFC 3608 (Oct. 2003), pp. 1-17.

J. Rosenberg et al., "SIP: Session Initiation Protocol," Network Working Group: The Internet Society, RFC 3261 (Jun. 2002), pp. 1-269.

* cited by examiner

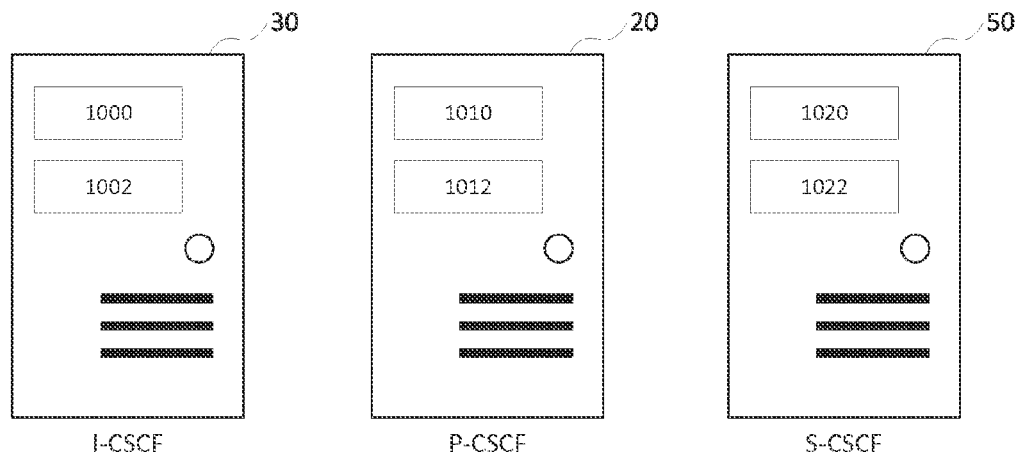
*Figure 10*  *Figure 11*  *Figure 12*
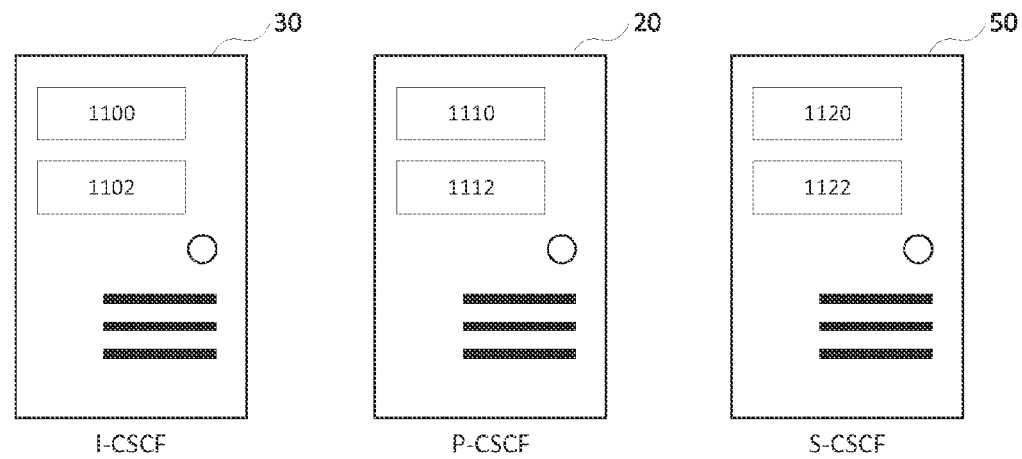
*Figure 13*  *Figure 14*  *Figure 15*

IMS SYSTEM AND METHOD FOR TRANSMITTING A REREGISTER REQUEST TO AN S-CSCF

TECHNICAL FIELD

The present invention relates to Internet Protocol (IP) Multimedia Subsystem (IMS), methods and nodes for bypassing a network node.

BACKGROUND

In Internet Protocol (IP) Multimedia Subsystem (IMS), the clients have to register to the network prior to receiving a service. The Home Subscriber Server (HSS) node is a critical node in the network and if the HSS is unavailable to process signaling requests, then the IMS network is unable to deliver services to the clients.

In Voice over Long Term Evolution (VoLTE) networks, there are many queries to the HSS during an attach/registration process. If the HSS is unavailable, this may lead to a critical situation where users in the network, all trying to register for the service, generate mass signaling.

According to the 3GPP standards, if the Interrogating Call Session Control Function (I-CSCF) is unable to complete the user registration status query procedure User-Authorization Request (UAR) to the HSS, it shall respond back to the UE with a negative User-Authorization Answer (UAA) response; either 403 Forbidden or 480 Temporary Unavailable.

However if the HSS is in an overload condition or if there is a failure in the communication link between the HSS and the I-CSCF, there could be thousands, if not millions, of users out of service in the IMS network. When these users are unable to register or reregister, they retry a number of times. The retry signaling creates extra signaling on all the network nodes in the registration process including the P-CSCF and I-CSCF in addition to the HSS.

In some cases, the UEs, after a number of retries, attempt to reregister in a secondary site. In this secondary site, communications channels towards the HSS may be available but this can lead to yet more signaling load on the HSS.

In a VoLTE network, both the Evolved Packet Core (EPC) network and the IMS network signal towards the HSS and this leads to a combined total of up to 16 signaling requests towards the HSS.

In a Voice over WI-FI (Vo WI-FI) network, WI-FI being a technology for wireless local area networking with devices based on the IEEE 802.11 standards, whenever the UE changes access networks between LTE and WI-FI, the UE performs a reregistration process.

The previous examples show that the reregistration process is a frequent process and is a signaling intensive process. There is currently no graceful mechanism to handle a scenario where the HSS is unreachable and the registration process is able to be successfully completed.

SUMMARY

It is therefore an object to provide a system, a method and nodes that obviate or mitigate at least some of the above described disadvantage.

There is provided an Internet Protocol (IP) Multimedia Subsystem (IMS) system configured to determine, based on statistics of success rate of past requests to a network node, a probability of success of a new request to the network node and upon determination that the probability of success of the new request is within a probability of success range, to transmit a reregister request directly to a Serving Call Session Control Function (S-CSCF) using an address of the S-CSCF provided in a Service Route header, thereby bypassing the network node.

There is provided a method for bypassing a network node comprising the steps of determining, based on statistics of success rate of past requests to the network node, a probability of success of a new request to the network node and upon determination that the probability of success of the new request is within a probability of success range, transmitting a reregister request directly to a Serving Call Session Control Function (S-CSCF) using an address of the S-CSCF provided in a Service Route header, thereby bypassing the network node.

There is provided an Interrogating Call Session Control Function (I-CSCF) comprising a processing circuit and memory, said memory containing instructions executable by said processing circuit whereby the I-CSCF is operative to determine, based on statistics of success rate of past requests to a Home Subscriber Server (HSS), a probability of success of a new request to the HSS and upon determination that the probability of success of the new request is within a probability of success range, transmit a reregister request directly to a Serving Call Session Control Function (S-CSCF) using an address of the S-CSCF provided in a Service Route header of the reregister request, thereby bypassing the HSS.

There is provided a Proxy Call Session Control Function (P-CSCF) comprising a processing circuit and memory, said memory containing instructions executable by said processing circuit whereby the P-CSCF is operative to determine, based on statistics of past availabilities of a Serving Call Session Control Function (S-CSCF), a probability of current availability of the S-CSCF and upon determination that the probability of current availability is within a probability of availability range, transmit a reregister request directly to the S-CSCF using an address of the S-CSCF provided in a Service Route header received from the S-CSCF during an initial registration.

There is provided a Serving Call Session Control Function (S-CSCF) comprising a processing circuit and memory, said memory containing instructions executable by said processing circuit whereby the S-CSCF is operative to determine, based on statistics of success rate of past requests to a Home Subscriber Server (HSS), a probability of success of a new request to the HSS and upon determination that the probability of success of the new request to the HSS is within a probability of success range, accept a reregister request without updating the HSS and set up a flag for a later update of the HSS.

There is provided an Interrogating Call Session Control Function (I-CSCF) for bypassing a Home Subscriber Server (HSS), the I-CSCF comprising a determination module for determining, based on statistics of success rate of past requests to a Home Subscriber Server (HSS), a probability of success of a new request to the HSS and a transmission module for transmitting, upon determination that the probability of success of the new request is within a probability of success range, a reregister request directly to a Serving Call Session Control Function (S-CSCF) using an address of the S-CSCF provided in a Service Route header of the reregister request, thereby bypassing the HSS.

There is provided a Proxy Call Session Control Function (P-CSCF) for bypassing a Home Subscriber Server (HSS) and an Interrogating Call Session Control Function (I-CSCF), the P-CSCF comprising a determination module for determining, based on statistics of past availabilities of a Serving Call Session Control Function (S-CSCF), a probability of current availability of the S-CSCF and a transmission module for transmitting, upon determination that the probability of current availability is within a probability of availability range, a reregister request directly to the S-CSCF using an address of the S-CSCF provided in a Service Route header received from the S-CSCF during an initial registration, thereby bypassing the HSS and the I-CSCF.

There is provided a Serving Call Session Control Function (S-CSCF) for bypassing a Home Subscriber Server (HSS), the S-CSCF comprising a determination module for determining, based on statistics of success rate of past requests to a Home Subscriber Server (HSS), a probability of success of a new request to the HSS and a reception module for accepting, upon determination that the probability of success of the new request to the HSS is within a probability of success range, a reregister request without updating the HSS and for setting up a flag for a later update of the HSS.

BRIEF DESCRIPTION OF THE DRAWINGS

FIGS. 10-15 illustrate I-CSCF, P-CSCF and S-CSCF nodes according to further embodiments.

DETAILED DESCRIPTION

The various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

Many aspects of the invention are described in terms of sequences of actions or functions to be performed by elements of a computer system or other hardware capable of executing programmed instructions. It will be recognized that the various actions could be performed by specialized circuits, by program instructions being executed by one or more processors, or by a combination of both. Moreover, the invention can additionally be considered to be embodied entirely within any form of computer readable carrier or carrier wave containing an appropriate set of computer instructions that would cause a processor to carry out the techniques described herein.

In some alternate implementations, the functions/acts may occur out of the order noted in the sequence of actions. Furthermore, in some illustrations, some blocks may be optional and may or may not be executed; these are generally illustrated with dashed lines.

The examples provided in the background section show that reregistration is a frequent and signaling intensive process and that there is currently no graceful mechanism to handle a scenario where the Home Subscriber Server (HSS) is unreachable and where the registration process is able to be successfully completed.

Figure 1:
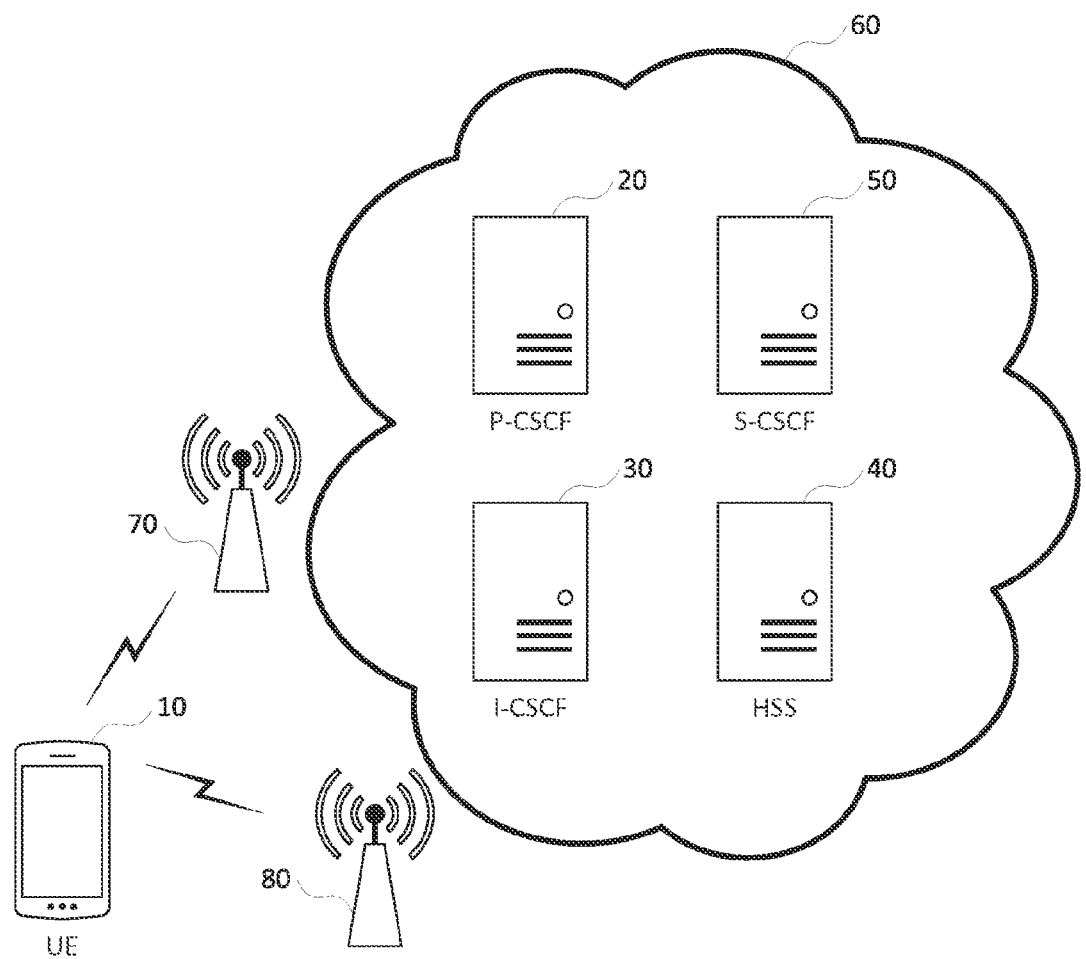
FIG. 1 schematically illustrates a network in which the method, system and nodes described herein may be implemented.

Referring now to FIG. 1, a portion of a network is illustrated. It comprises a User Equipment (UE) 10, Access Nodes such as Long Term Evolution (LTE) Evolved Node B (eNB) 70 and WI-FI access node 80. Not illustrated, another access point could be a fixed line access with IMS. These access nodes provide a first access towards the Internet Protocol (IP) Multimedia Subsystem (IMS) network 60, which provides services to the UE and which comprises, among others, a Proxy Call Session Control Function (P-CSCF) 20, an Interrogating Call Session Control Function (I-CSCF) 30, as Serving Call Session Control Function (S-CSCF) 50 and a HSS 40.

Figure 2:
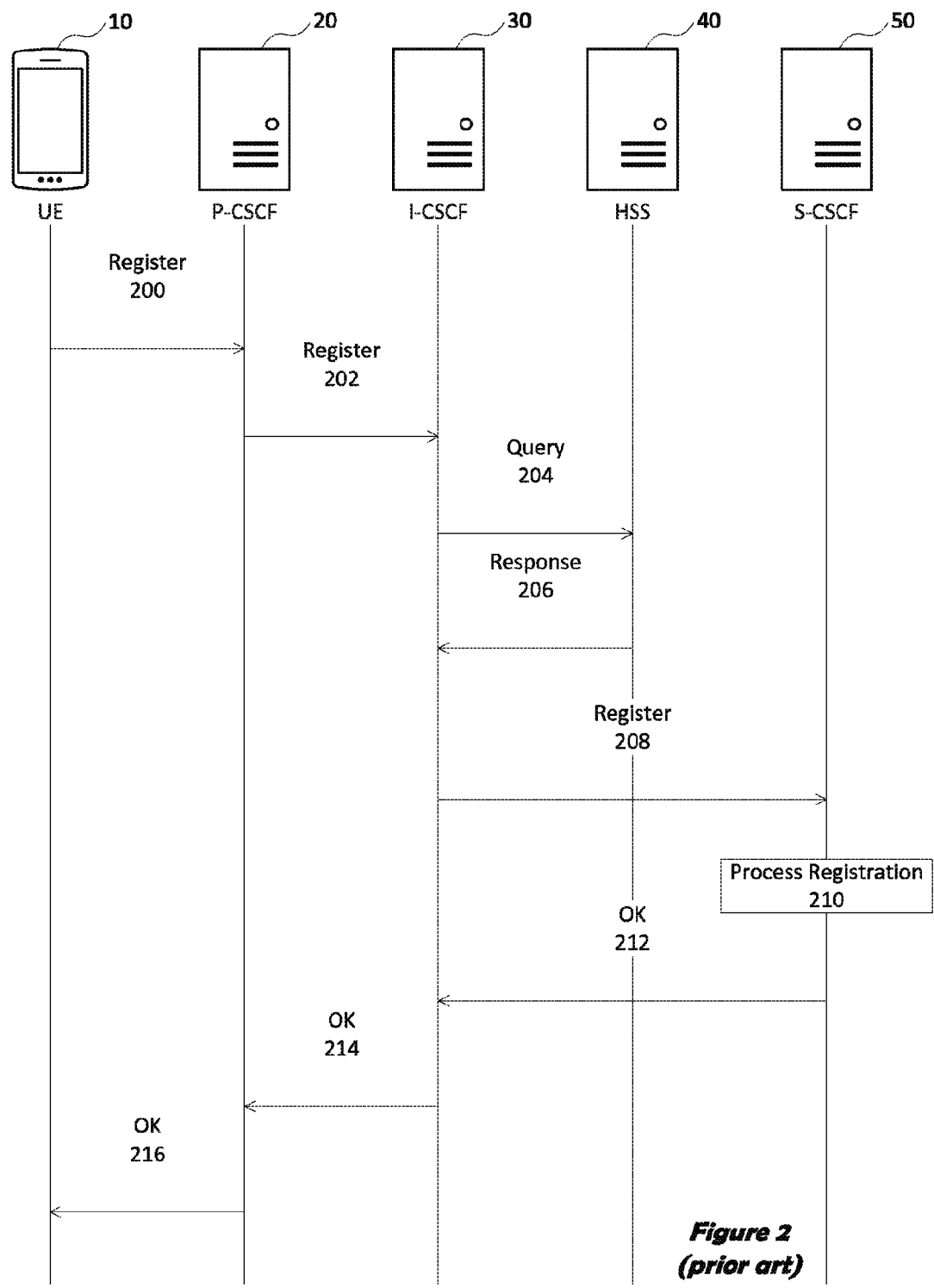
FIG. 2 is a signaling diagram illustrating the registration information flow according to 3GPP TS 23.228 Release 12.

FIG. 2 illustrates the registration information flow according to 3GPP TS 23.228 Release 12, which is the registration process in use at the date of filing of this patent application. According to this flow, a request for registration, step 200, is sent from a UE 10 to a P-CSCF 20. The request for registration is forwarded to the I-CSCF 30, step 202, which queries the HSS 40, step 204, and receives a response, step 206. The response to the query comprises the name of the S-CSCF 50 or its capabilities, if the name is not known. The I-CSCF 30 then forwards the registration request, step 208, to the S-CSCF 50, as identified by name or capabilities. The registration is processed at step 210, and OKs are returned at steps 212, 214 and 216.

According to the current 3GPP standard, the reregistration process follows the same signaling flow as the initial registration process and the signaling must traverse the P-CSCF 20, the I-CSCF 30, the HSS 40, and finally the S-CSCF 50. The initial registration and the reregistration procedures necessitate that the I-CSCF 30 sends a user registration status or User Authorization Request (UAR) query, step 204, to the HSS 40 to determine which serving S-CSCF 50 is serving the user. If the HSS 40 is unable to respond to the request, the reregistration process fails as the I-CSCF 30 does not have any routing information for the serving S-CSCF 50.

Figure 3:
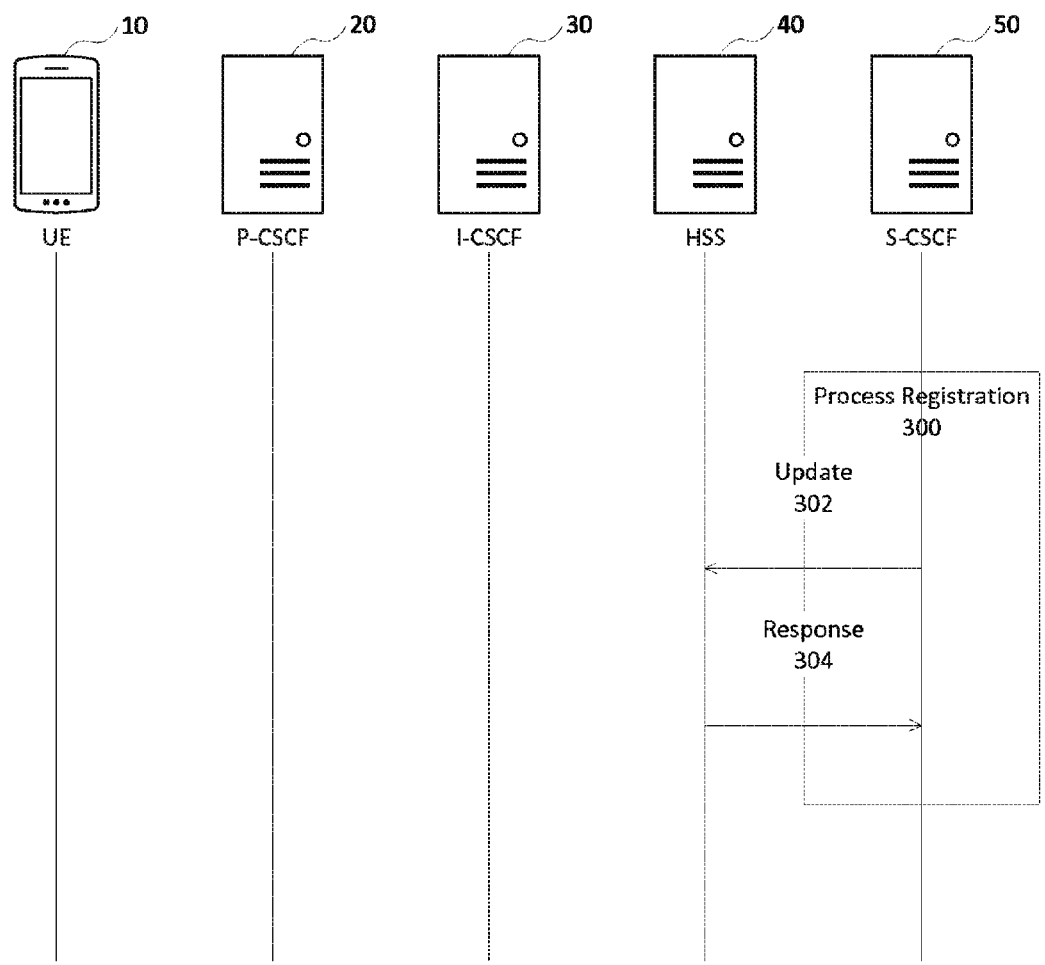
FIG. 3 is a signaling diagram illustrating the process registration of FIG. 2.

FIG. 3 illustrates in more details how the S-CSCF process registration 300. First, an update request is sent to the HSS 40, step 302, and then a response is received, step 304.

Figure 4:
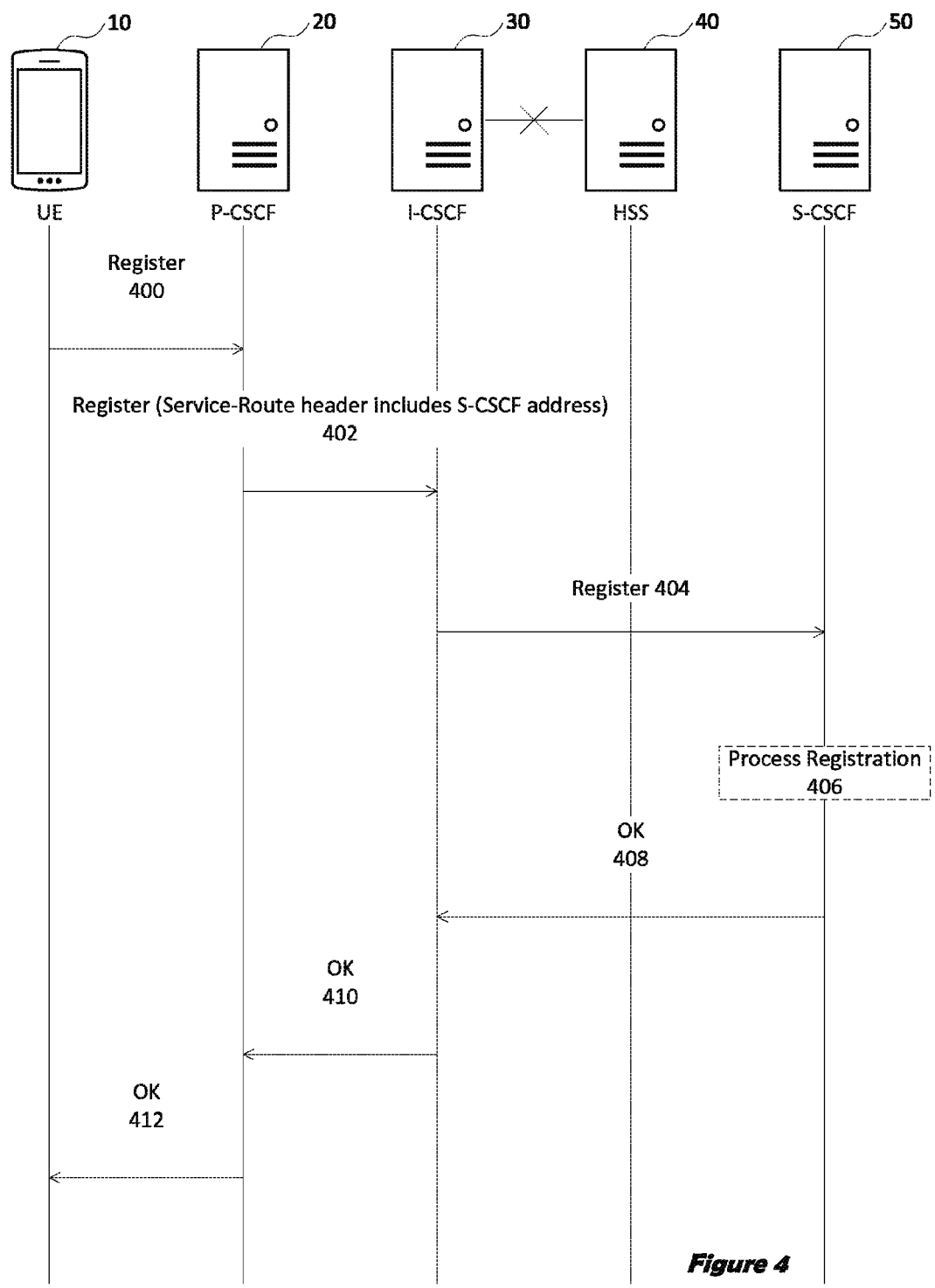
FIG. 4 is a signaling diagram illustrating a flow according to an embodiment.

Now referring to FIG. 4, which is a signaling diagram according to a first embodiment, during a successful initial registration procedure, the S-CSCF 50 informs the P-CSCF 20, via information in a Service Route header, of the address of the S-CSCF 50 that is serving the UE 10. The UE 10 then sends a subsequent registration request, step 400. For example, the UE 10 may send a reregister request to update its registration after an expiry period. Alternatively, it could send a reregister request when switching from an LTE 70 to a WI-FI 80 access point.

According to the current 3GPP standard, the Service Route is not used for routing during the reregistration process. As mentioned above, the reregistration process follows the same signaling flow as the initial registration process. However, the P-CSCF 20 stores the Service Route and can use the information for routing the subsequent reregister requests or call initiation requests.

Since the P-CSCF stores the Service Route associated with a particular UE 10 and S-CSCF 50 combination, the P-CSCF 20 can determine if the UE 10 is performing an initial registration or a reregistration. Following such determination, the P-CSCF 20 can indicate to the other nodes in the IMS network 60 that the registration request is in fact a reregistration request. For example, when the P-CSCF has determined that the registration request is a reregistration, it can append the Service Route that was stored during the initial registration to the reregister request before sending it to the I-CSCF 30, step 402.

According to the current version of the 3GPP standard, when the I-CSCF 30 receives a register request from the P-CSCF 20, it cannot differentiate between an initial registration and a reregistration. The presence of the Service Route information in the reregister request can therefore be used by the I-CSCF 30 to differentiate between an initial registration and reregistration.

The Service Route information in the reregister request also provides a framework on how the I-CSCF 30 can decide whether to forward the request to the S-CSCF 50 or to forward the request to the HSS 40 as per usual behavior.

The I-CSCF 30, which now has the serving S-CSCF 50 routing information included in the reregister request, can proceed to forward the reregister request to the serving S-CSCF 50, step 404. The Service route does not need to be included in the reregister request when sent from the I-CSCF to the S-CSCF.

According to this embodiment, the I-CSCF 30 keeps statistics on the success rate of the transactions e.g. on the Diameter Cx/Dx interfaces to the HSS 40. The I-CSCF 30 makes use of these statistics to determine if statistically, the current UAR transaction for the reregistration request has a high potential of being unsuccessful. If the potential for an unsuccessful outcome is high, e.g. within a predefined range such as 10% to 100%, then the I-CSCF 30 forward the reregister request directly to the S-CSCF 50. Of course ranges different than the ones provided herein could be used. Further, the ranges described herein could also be represented with a single value, i.e. a threshold, to which the statistical value could be compared. A person skilled in the art would recognize that both are equivalents.

If the potential for a successful outcome is high, then the I-CSCF 30 can send the UAR request to the HSS 40.

A case where the I-CSCF 30 determines to send the UAR to the HSS 40 but that the transaction is not successful could indicate one of the following scenarios: there was a response time out, there is a buffer congestion or the HSS indicates it is unable to process the request due to overload conditions (e.g. User Authorization Answer (UAA) received with 3004).

Once the S-CSCF 50 receives the registration request, it can then continue to process the registration, step 406. Then, OKs are returned, steps 408, 410 and 412.

Figure 5:
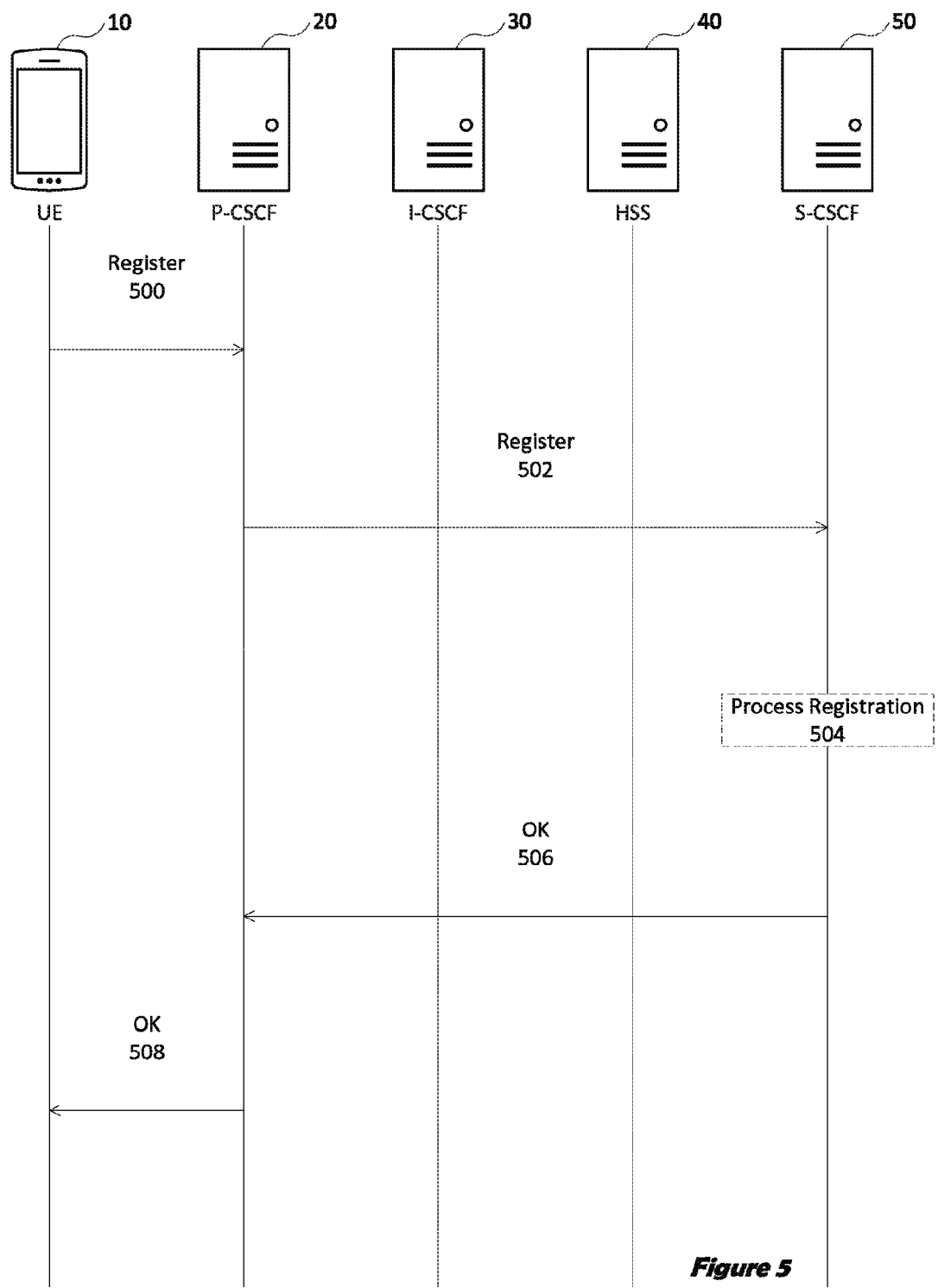
FIG. 5 is a signaling diagram illustrating a flow according to another embodiment.

FIG. 5, illustrates a reregistration with HSS 40 and I-CSCF 30 bypass. In this embodiment, the P-CSCF bypasses the HSS 40 as well as the I-CSCF 30 based on slightly modified criteria compared to the previous embodiment.

In the embodiment illustrated at FIG. 5, the P-CSCF 20 keeps track of the availability status of the S-CSCF 50. We recall that the P-CSCF 20 stores the S-CSCF 50 associated with each UE 10 already registered.

The P-CSCF 20 monitors the availability of the S-CSCF 50 during the last registration period. For example, if the registration period is 1 hour, and the S-CSCF 50 has not restarted within the last hour, then the P-CSCF 20 can assume that the serving S-CSCF 50 has not change during that reregistration period and can forward the reregistration request to the same S-CSCF 50.

However if the P-CSCF 20 has detected that the S-CSCF 50 has restarted during the last registration period, then the P-CSCF 20 can execute the legacy behavior which is to forward the request to the I-CSCF 30.

The P-CSCF 20 can use, for example, the standard SIP OPTION mechanism to monitor the availability of an S-CSCF 50. Or it can use information from the ongoing traffic signaling to know that an S-CSCF 50 is available or not.

The P-CSCF maintains the S-CSCF 50 availability information during the last registration period of a UE 10. Typically the registration period is set to one common value for all UEs registered with the P-CSCF 20. Using the S-CSCF 50 availability status during the current registration period, the P-CSCF 20 can use this information modify its behavior during the reregistration process.

When the reregister request is received, step 500, and there is no location information or contact information change (e.g. no change in P-Access-Network-Info (PANI) or contact IP address), the P-CSCF 20 can assume that the reregistration process is only for the UE's 10 update after a registration expiry timer. The registration expiry time is only of interest to the S-CSCF 50 (and the Application servers that are subscribed to the users registration status or who received 3rd party registration updates) and not to the I-CSCF 30 and HSS 40.

If the P-CSCF 20 has determined that the S-CSCF 50 has had uninterrupted availability status during the last registration period, then the P-CSCF 20 can forward the reregister request directly to the S-CSCF 50, step 502, therefore bypassing the I-CSCF 30 and the HSS 40. Forwarding the request directly to the S-CSCF 50 reduces the network signaling.

There may be solutions where the contact IP address has not changed but the location information (as identified by the PANI header) has changed. In some deployments, the change in location may be of interest to other nodes such as the HSS 40 for authorization validation. If that is the case, then the P-CSCF 20 can forward the reregister request to the I-CSCF 30.

In other solutions, such as when a UE is handed over from LTE 70 to WI-FI 80 calling, there is no change in the IP address but a change in the PANI information. Typically, the change in PANI information is only of interest to the Application server. In this deployment, the I-CSCF 30 bypass can be performed.

The steps executed by the S-CSCF 50, to update the HSS 40 about the user's registration status with a Server-Assignment-Request (SAR), step 504, when the HSS 40 is available, are illustrated in FIG. 3, previously described. Then, OKs are returned, steps 506 and 508.

When the S-CSCF receives the reregistration request, it may not be aware that the HSS 40 or the I-CSCF 30 was bypassed during the process. It should normally treat the reregistration request as usual.

However, there may be some network scenarios that cause the HSS 40 to update the user's serving S-CSCF 50 to be another S-CSCF: S-CSCF2. This happens when, for example, the serving S-CSCF 50, S-CSCF1, is available but some other nodes in the network are unable to communicate with the S-CSCF1 due to link failure conditions. In such a case, the IMS S-CSCF restoration procedures for terminating calls successfully delivers a terminating call to the user on another S-CSCF, S-CSCF2.

To summarize, the P-CSCF still has the address of S-CSCF1, the HSS has the address of S-CSCF2, S-CSCF1 still thinks that it is serving the UE but it is S-CSCF2 that is actually serving the UE. This is not a desirable scenario.

The UE's P-CSCF and the UE's original S-CSCF, S-CSCF1, are not aware that the UE serving S-CSCF has changed to S-CSCF2. The P-CSCF database may indicate that S-CSCF1 is the UE's serving S-CSCF but the HSS indicates that the S-CSCF2 is the UE's serving S-CSCF.

Figure 6:
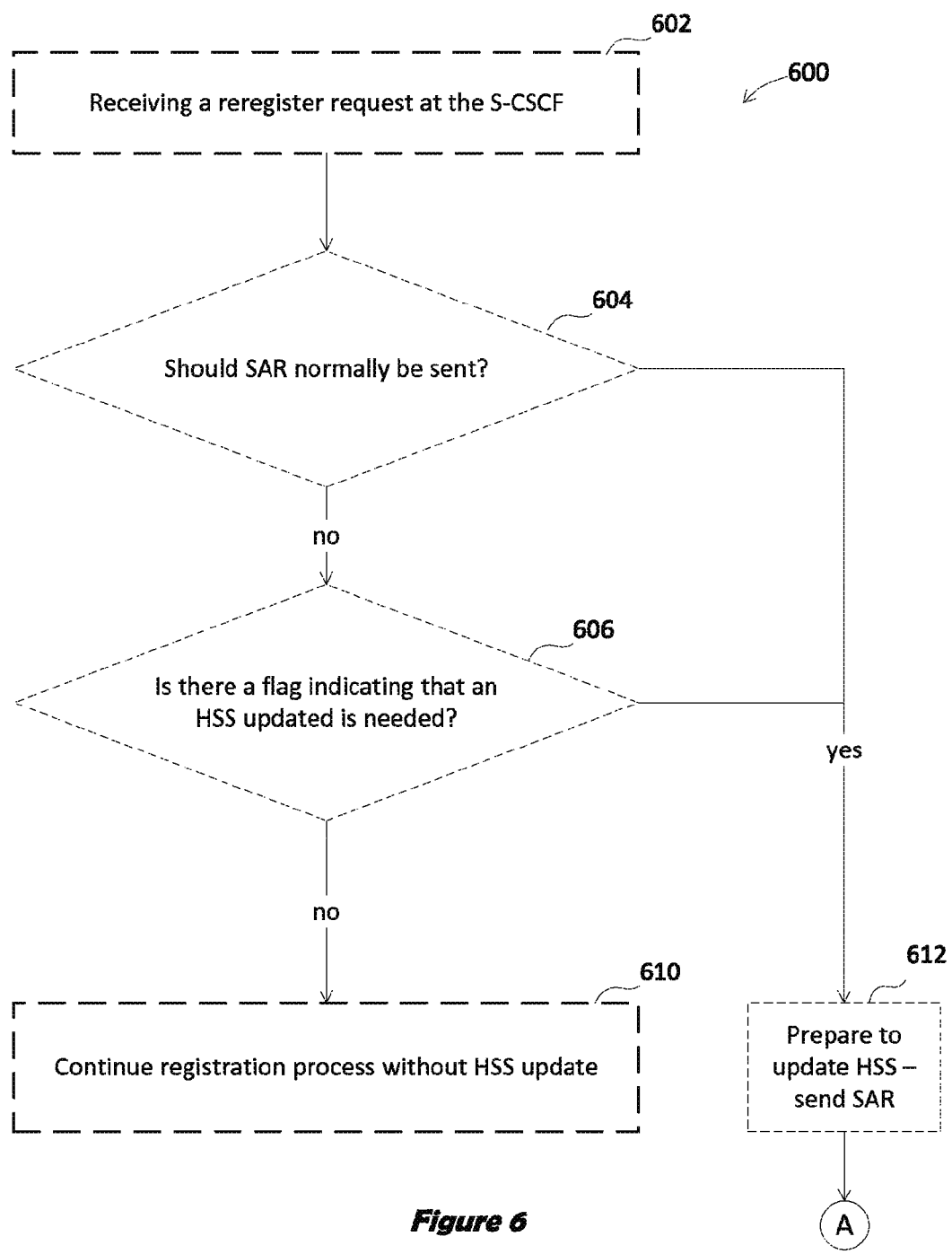
FIGS. 6 and 7 illustrate a flowchart of a method for updating a network node according to an embodiment.

FIG. 6 illustrates a method 600 addressing this problem, and used for deciding if the HSS should be updated.

When S-CSCF 1 receives the reregister request, step 602, it may already have the UE's profile downloaded, along with updated authentication vectors, and may not need to send a Server-Assignment-Request (SAR) to the HSS 40. The registration procedure in such a case should execute successfully. However, the network situation will be such that the HSS has S-CSCF2 as the user's server and the P-CSCF has S-CSCF1 as the user's server. The originating calls, and the terminating calls will be handled by two different S-CSCFs and this will cause many unwanted behaviors in the network.

In order to avoid such undesirable behaviors, the S-CSCF should check if SAR should normally be sent to the HSS, step 604. If yes, then the S-CSCF may send the SAR to the S-CSCF, step 612. If no, the S-CSCF then checks it there is an indication that an HSS update is needed, step 606. If yes, then the S-CSCF may send the SAR to the S-CSCF, step 612. If no, then the S-CSCF continues the registration process without HSS update, step 610.

Figure 7:
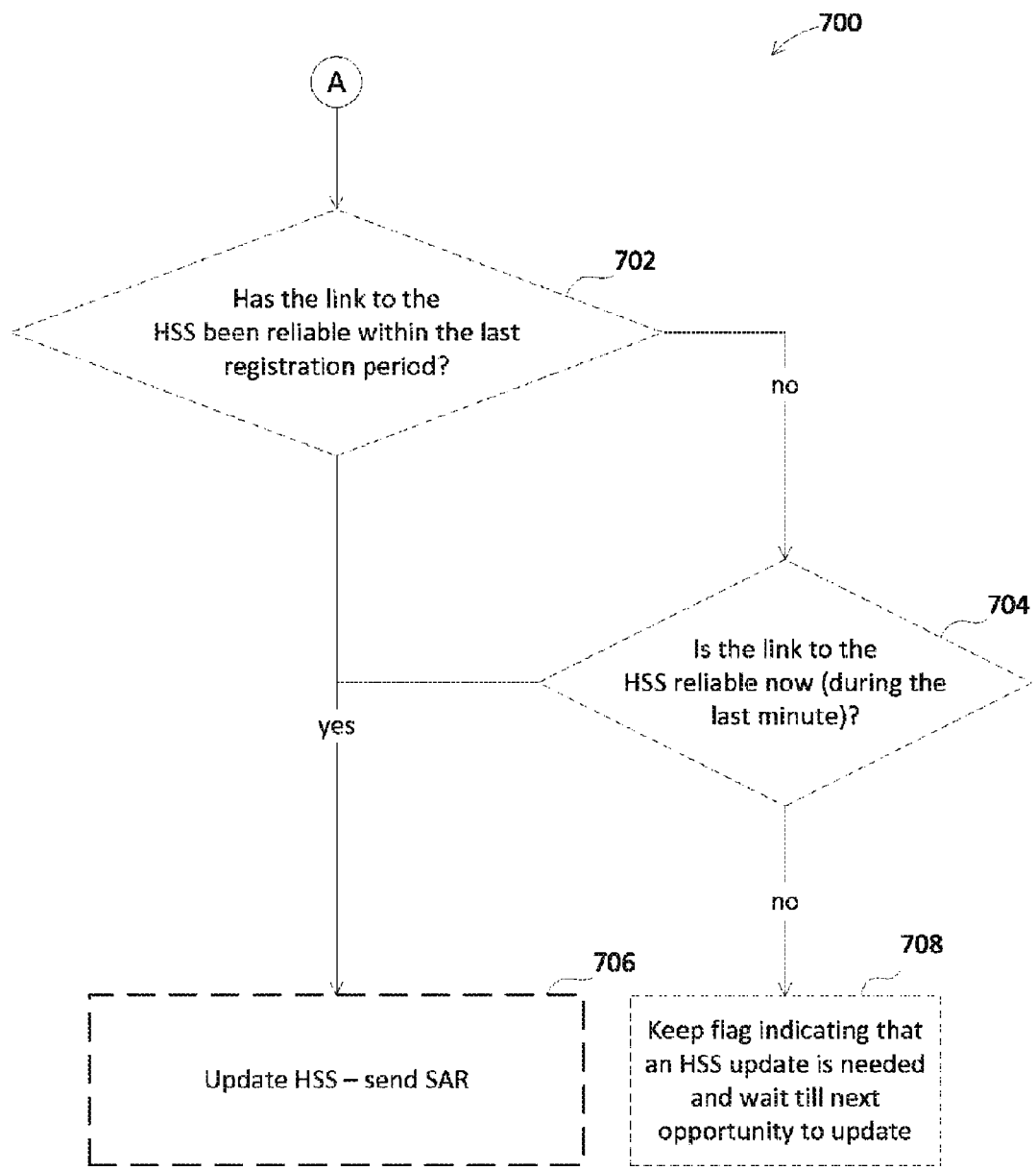

FIG. 7 illustrates a method 700 for further deciding if the HSS should be updated. The S-CSCF should periodically send a SAR to the HSS to avoid a prolonged out of synchronization scenario such as described above. In order to do so, the S-CSCF may keep statistics on the success rate of the transaction towards the HSS 40. The statistics could alternately be kept in another network node. The S-CSCF makes use of these statistics to determine if, statistically, the current SAR transaction should be sent to the HSS or not (even though the current logic indicates that a SAR request is not needed).

In order to do so, the S-CSCF maintains statistic on the health of the communication link between itself and the HSS. In many deployments, the S-CSCF and the I-CSCF may share the same communication link. Therefore, the statistics can be maintained for the shared communication link, in either one of the nodes, in both nodes or in an altogether different network node.

The S-CSCF is provided with information regarding the health status of the link over the last registration period, e.g. a long term indicator, and the health status of the link for the current time period (i.e. last minute), e.g. a short term indicator.

If the long term indicator is not good e.g. the link was not functioning 100% of the time during the last registration period, and the short term indicator is good e.g. the link was functioning 90% to 100% of the time during the last minute, then the S-CSCF sends the SAR to the HSS. The ranges provided herein are only examples and could be different in different contexts.

If the long term indicator is not good, and the short term indicator is not good, then the S-CSCF does not send the SAR to the HSS but indicate that it needs to be sent the next time. Setting a flag is one of numerous ways of setting an indicator.

Figure 8:
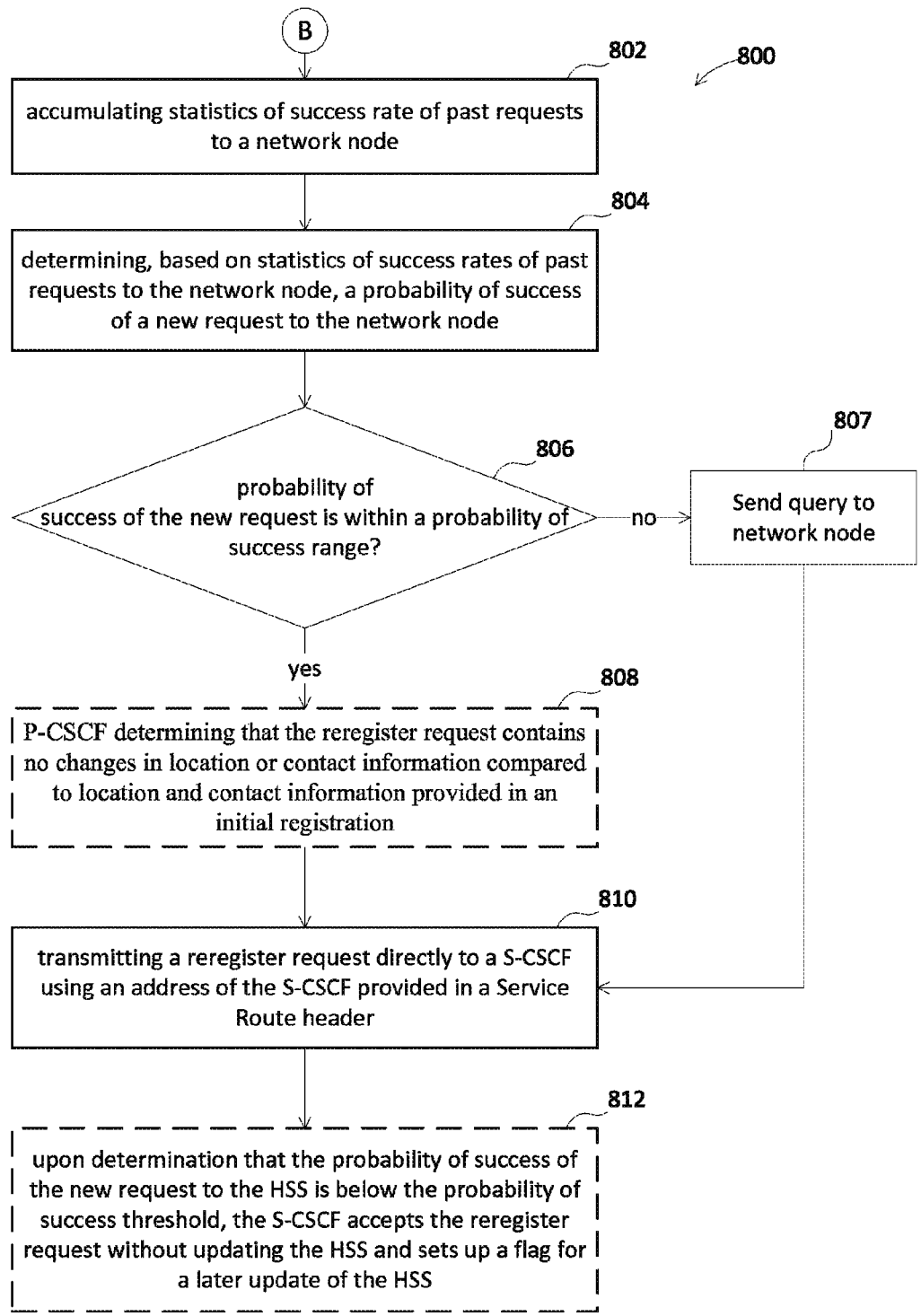
FIGS. 8 and 9 illustrate a flowchart of a method for bypassing a network node according to an embodiment.

FIG. 8, illustrates a method, 800, according to an embodiment, where an Internet Protocol (IP) Multimedia Subsystem (IMS) system 60 is configured to determine, based on statistics of success rate of past requests to a network node, step 802, a probability of success of a new request to the network node, step 804, and upon determination that the probability of success of the new request is within a probability of success range, to transmit, step 810, a reregister request directly to a Serving Call Session Control Function (S-CSCF) 50 using an address of the S-CSCF provided in a Service Route header, thereby bypassing the network node.

Alternatively, the system could be configured to initiate transmission of the reregister request towards the S-CSCF.

When the network node is a Home Subscriber Server (HSS) 40, the determination and transmission are executed by an Interrogating Call Session Control Function (I-CSCF) 30 and the Service Route header is included in the reregister request.

In contrast, when the network node is the S-CSCF 50, the determination and transmission are executed in a Proxy Call Session Control Function (P-CSCF) 20 and the Service Route header was received from the S-CSCF during an initial registration.

Figure 9:
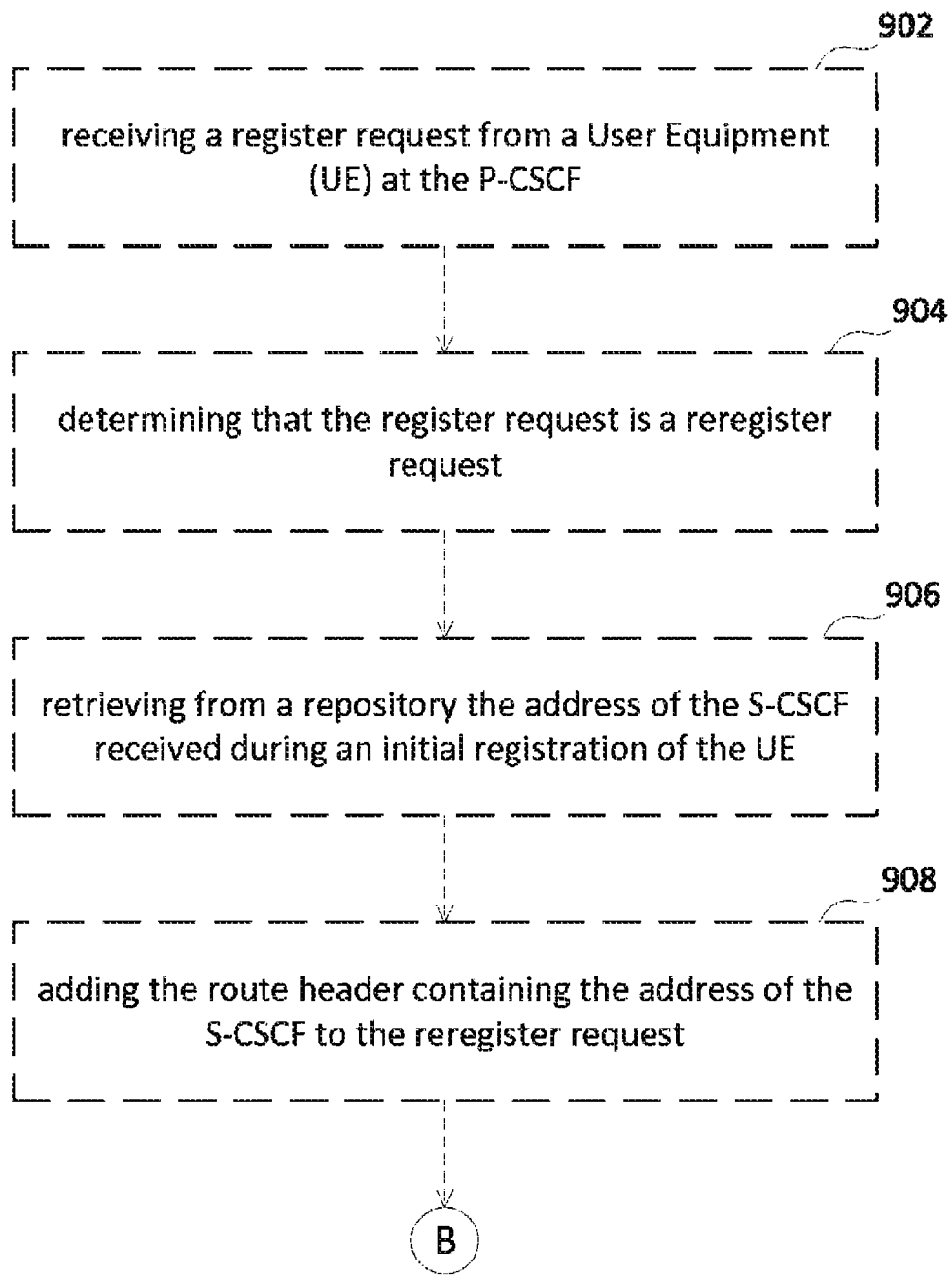

Referring now to FIG. 9, the IMS system 60 receives a register request from a User Equipment (UE) at a Proxy Call Session Control Function (P-CSCF), step 902. The P-CSCF determines that the register request is a reregister request, step 904. The P-CSCF retrieves from a repository the address of the S-CSCF received during an initial registration of the UE, step 906. The P-CSCF 20 adds the Service Route header containing the address of the S-CSCF to the reregister request, step 908.

The repository of the P-CSCF can be a memory located inside the P-CSCF node or an external memory accessible to the P-CSCF.

Returning to FIG. 8, the IMS system 60 is further configured to determine, step 808, that the reregister request contains no changes in location or contact information compared to location and contact information provided in an initial registration and to transmit, step 810, the reregister request directly to the S-CSCF 50 upon further determination that the reregister request contains no changes in location or contact information.

The location information may be comprised in a P-Access-Network-Info (PANI). In some alternatives it might be included in a Geo-Loc header. The contact information may be comprised in a contact header which can comprise an IP address and/or a sip instance.

When the network node is a Home Subscriber Server (HSS) 40, the S-CSCF 50, upon determination that the probability of success of the new request to the HSS is within the probability of success range, may accept the reregister request without updating the HSS 40 and may set up a flag for a later update of the HSS, step 812.

The IMS systems may be implemented in a cloud or virtualized environment and may be a virtual IMS system, with its different components, nodes and servers either co-located in a single geographical area or geographically dispersed in distant locations.

The method and system described above eliminate additional and unnecessary signaling to the HSS 40 and enable processing reregistration requests with minimal involvement of the HSS. This frees ups the HSS to process other signaling required for other use cases.

This is of particular benefits in situation where the HSS is unstable or if the links to the HSS are not available. With the existing solution, mass signaling due to retries and failovers are generated in such instances and the IMS networks become unreliable. When the users are unable to register, the S-CSCF 50 nodes deregister the users when their registration periods expire. When this happens on a large scale, the effect is a major outage that can last as long as many hours.

The method and system described above make the IMS networks more robust. The method may be applied at all time or when the HSS is overloaded. It can also be applied in scenarios where there are infrequent changes to the serving S-CSCF 50, thus providing efficient signaling on a network level.

FIG. 10 is a block diagram of an I-CSCF node 30 suitable for implementing aspects of the embodiments disclosed herein. The I-CSCF 30 comprises a processing circuit 1000 and memory 1002. The memory 1002 contains instructions executable by the processing circuit 1000 whereby the I-CSCF 30 is operative to determine, based on statistics of success rate of past requests to a Home Subscriber Server (HSS), a probability of success of a new request to the HSS and upon determination that the probability of success of the new request is within a probability of success range, to transmit a reregister request directly to a Serving Call Session Control Function (S-CSCF) using an address of the S-CSCF provided in a Service Route header of the reregister request, thereby bypassing the HSS.

The I-CSCF 30 may further include a communications interface (not illustrated) for sending and receiving communications to and from other network nodes, either directly or via the IMS network. Those skilled in the art will appreciate that the block diagram of the I-CSCF 30 necessarily omits numerous features that are not necessary for a complete understanding of this disclosure.

The I-CSCF 30 may also include one or more storage media (not illustrated) for storing data necessary and/or suitable for implementing the functionality described herein, as well as for storing the programming instructions which, when executed on the processing circuits 1000, implement all or part of the functionality described herein.

FIG. 11 is a block diagram of a P-CSCF node 20 suitable for implementing aspects of the embodiments disclosed herein. The P-CSCF 20 comprises a processing circuit 1010 and memory 1012. The memory 1012 contains instructions executable by the processing circuit 1010 whereby the P-CSCF 20 is operative to determine, based on statistics of past availabilities of a S-CSCF 50, a probability of current availability of the S-CSCF 50 and upon determination that the probability of current availability is within a probability of availability range, to transmit a reregister request directly to the S-CSCF 50 using an address of the S-CSCF 50 provided in a Service Route header received from the S-CSCF during an initial registration.

The P-CSCF 20 may further include a communications interface (not illustrated) for sending and receiving communications to and from other network nodes, either directly or via the IMS network. Those skilled in the art will appreciate that the block diagram of the P-CSCF 20 necessarily omits numerous features that are not necessary for a complete understanding of this disclosure.

The P-CSCF 20 may also include one or more storage media (not illustrated) for storing data necessary and/or suitable for implementing the functionality described herein, as well as for storing the programming instructions which, when executed on the processing circuits 1010, implement all or part of the functionality described herein.

FIG. 12 is a block diagram of an S-CSCF node 50 suitable for implementing aspects of the embodiments disclosed herein. The S-CSCF 50 comprises a processing circuit 1020 and memory 1022. The memory 1022 contains instructions executable by the processing circuit 1020 whereby the S-CSCF 50 is operative to determine, based on statistics of success rate of past requests to a Home Subscriber Server (HSS) 40, a probability of success of a new request to the HSS and upon determination that the probability of success of the new request to the HSS is within a probability of success range, to accept a reregister request without updating the HSS and set up a flag for a later update of the HSS.

The S-CSCF 50 may further include a communications interface (not illustrated) for sending and receiving communications to and from other network nodes, either directly or via the IMS network. Those skilled in the art will appreciate that the block diagram of the S-CSCF 50 necessarily omits numerous features that are not necessary for a complete understanding of this disclosure.

The S-CSCF 50 may also include one or more storage media (not illustrated) for storing data necessary and/or suitable for implementing the functionality described herein, as well as for storing the programming instructions which, when executed on the processing circuits 1020, implement all or part of the functionality described herein.

FIG. 13 is a block diagram of another I-CSCF node 30 suitable for implementing aspects of the embodiments disclosed herein. The I-CSCF 30 is for bypassing a Home Subscriber Server (HSS) and comprises a determination module 1100 for determining, based on statistics of success rate of past requests to a Home Subscriber Server (HSS), a probability of success of a new request to the HSS and a transmission module 1102 for transmitting, upon determination that the probability of success of the new request is within a probability of success range, a reregister request directly to a Serving Call Session Control Function (S-CSCF) using an address of the S-CSCF provided in a Service Route header of the reregister request, thereby bypassing the HSS.

FIG. 14 is a block diagram of another P-CSCF node 20 suitable for implementing aspects of the embodiments disclosed herein. The P-CSCF is for bypassing a Home Subscriber Server (HSS) and an Interrogating Call Session Control Function (I-CSCF) and comprises a determination module 1110 for determining, based on statistics of past availabilities of a Serving Call Session Control Function (S-CSCF), a probability of current availability of the S-CSCF and a transmission module 1112 for transmitting, upon determination that the probability of current availability is within a probability of availability range, a reregister request directly to the S-CSCF using an address of the S-CSCF provided in a Service Route header received from the S-CSCF during an initial registration, thereby bypassing the HSS and the I-CSCF.

FIG. 15 is a block diagram of another S-CSCF node 50 suitable for implementing aspects of the embodiments disclosed herein. The S-CSCF is for bypassing a Home Subscriber Server (HSS) and comprises a determination module 1120 for determining, based on statistics of success rate of past requests to a Home Subscriber Server (HSS), a probability of success of a new request to the HSS and a reception module 1122 for accepting, upon determination that the probability of success of the new request to the HSS is within a probability of success range, a reregister request without updating the HSS and for setting up a flag for a later update of the HSS.

Embodiments of the present disclosure may also be implemented as computer program products that are stored on computer-readable storage mediums, the computer program products including programming instructions that are configured to cause the processing circuits to carry out the steps described herein.

The invention has been described with reference to particular embodiments. However, it will be readily apparent to those skilled in the art that it is possible to embody the invention in specific forms other than those of the embodiments described above. The described embodiments are merely illustrative and should not be considered restrictive in any way. The scope of the invention is given by the appended claims, rather than the preceding description, and all variations and equivalents that fall within the range of the claims are intended to be embraced therein.

The invention claimed is:

1. An Internet Protocol (IP) Multimedia Subsystem (IMS) system comprising a transmission module, a processing circuit and a memory, said memory containing instructions executable by said processing circuit whereby the IMS system is operative to:
   determine, using the processing circuit, based on statistics of success rate of past requests to a network node, a probability of success of a new request to the network node; and
   upon determination that the probability of success of the new request is within a probability of success range, transmit, using the transmission module, a reregister request directly to a Serving Call Session Control Function (S-CSCF) using an address of the S-CSCF provided in a Service Route header, thereby bypassing the network node.

2. The IMS system of claim 1, wherein the network node is a Home Subscriber Server (HSS).

3. The IMS system of claim 2 wherein the determination and transmission are executed by an Interrogating Call Session Control Function (I-CSCF) and wherein the Service Route header is included in the reregister request.

4. The IMS system of claim 1, wherein the network node is the S-CSCF.

5. The IMS system of claim 4 wherein the determination and transmission are executed in a Proxy Call Session Control Function (P-CSCF) and wherein the Service Route header was received from the S-CSCF during an initial registration.

6. The IMS system of claim 1 wherein a register request is received from a User Equipment (UE) at a Proxy Call Session Control Function (P-CSCF), wherein the P-CSCF determines that the register request is a reregister request, wherein the P-CSCF retrieves from a repository the address of the S-CSCF received during an initial registration of the UE and wherein the P-CSCF adds the Service Route header containing the address of the S-CSCF to the reregister request.

7. The IMS system of claim 1, further configured to:
   determine that the reregister request contains no changes in location or contact information compared to location and contact information provided in an initial registration; and
   transmit the reregister request directly to the S-CSCF upon further determination that the reregister request contains no changes in location or contact information.

8. The IMS system of claim 7 wherein the location information is comprised in a P-Access-Network-Info (PANI) and the contact information is comprised in a contact header.

9. The IMS system of claim 2, wherein the S-CSCF, upon determination that the probability of success of the new request to the HSS is within the probability of success range, accepts the reregister request without updating the HSS and sets up a flag for a later update of the HSS.

10. The IMS system of claim 1 wherein the IMS system is a virtual IMS system.

11. A method for bypassing a network node comprising steps of:
    determining, based on statistics of success rate of past requests to the network node, a probability of success of a new request to the network node; and
    upon determination that the probability of success of the new request is within a probability of success range, transmitting a reregister request directly to a Serving Call Session Control Function (S-CSCF) using an address of the S-CSCF provided in a Service Route header, thereby bypassing the network node.

12. The method of claim 11, wherein the network node is a Home Subscriber Server (HSS).

13. The method of claim 12 wherein the determination and transmission are executed by an Interrogating Call Session Control Function (I-CSCF) and wherein the Service Route header is included in the reregister request.

14. The method of claim 11, wherein the network node is the S-CSCF.

15. The method of claim 14 wherein the determination and transmission are executed in a Proxy Call Session Control Function (P-CSCF) and wherein the Service Route header was received from the S-CSCF during an initial registration.

16. The method of claim 11, further comprising steps, executed at a Proxy Call Session Control Function (P-CSCF), of:
    receiving a register request from a User Equipment (UE) at the P-CSCF;
    determining that the register request is a reregister request;
    retrieving from a repository the address of the S-CSCF received during an initial registration of the UE; and
    adding the Service Route header containing the address of the S-CSCF to the reregister request.

17. The method of claim 11, further comprising steps of:
    determining that the reregister request contains no changes in location or contact information compared to location and contact information provided in an initial registration; and
    transmitting the reregister request directly to the S-CSCF upon further determination that the reregister request contains no changes in location or contact information.

18. The IMS system of claim 17 wherein the location information is a P-Access-Network-Info (PANI) and the contact information is an IP address.

19. The method of claim 12, wherein the S-CSCF, upon determination that the probability of success of the new request to the HSS is within the probability of success range, accepts the reregister request without updating the HSS and sets up a flag for a later update of the HSS.

20. The method of claim 11 wherein the method is executed in a virtual IMS system.

* * * * *